Jan. 9, 1968  B. S. WILKINSON  3,362,479
DRIVE SHAFT ASSEMBLY
Filed Oct. 19, 1965  2 Sheets-Sheet 1
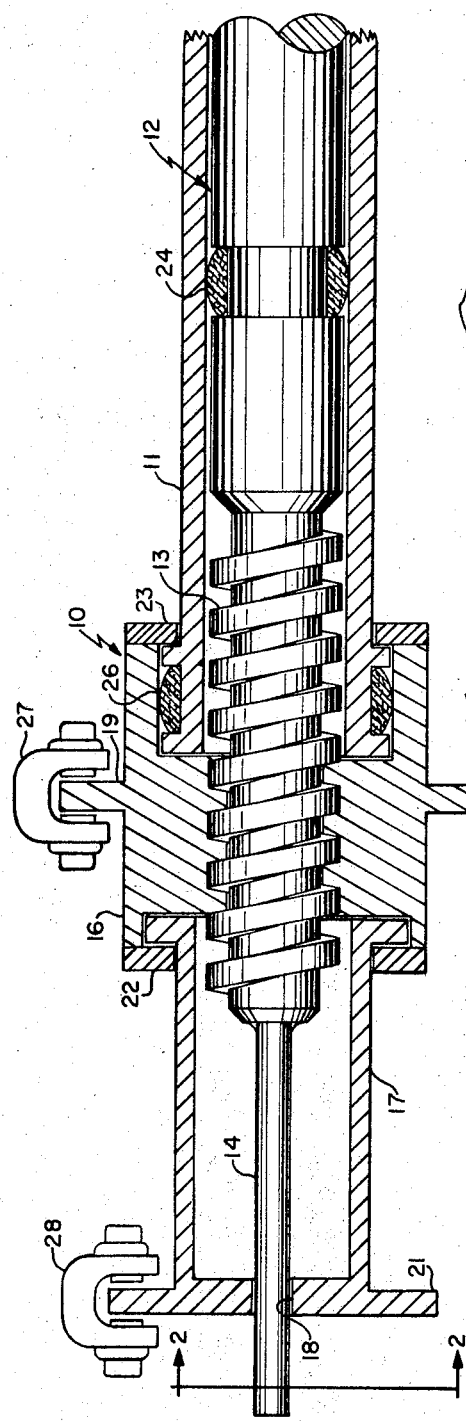
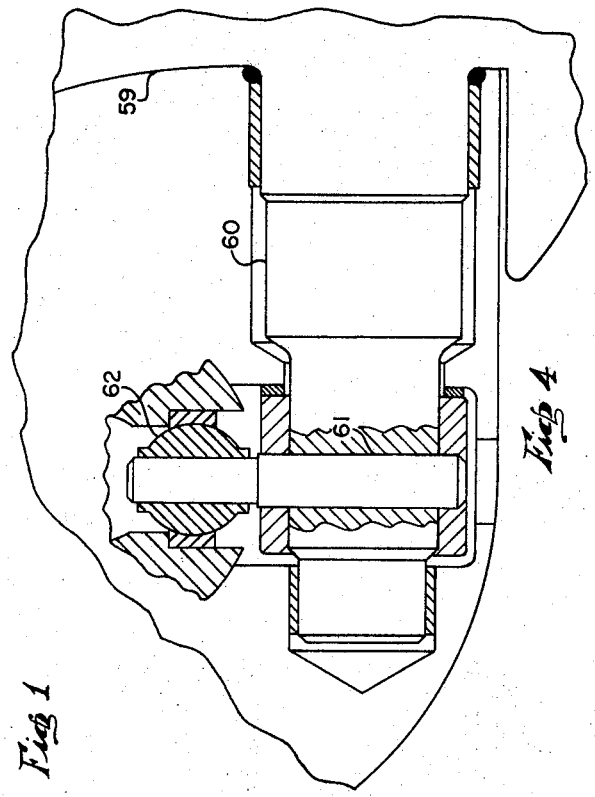
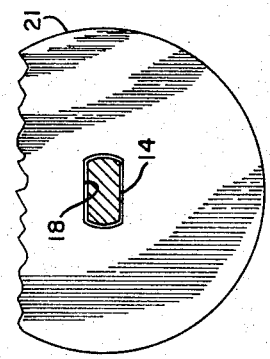
INVENTOR
BRUCE S. WILKINSON
BY
ATTORNEYS

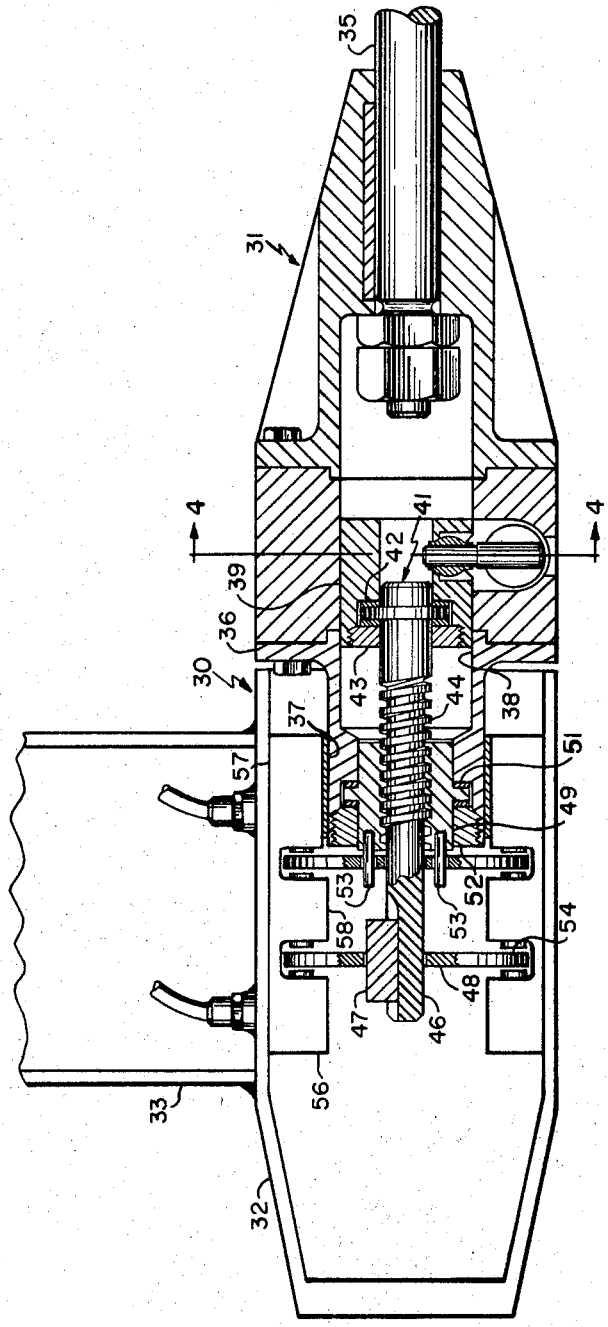

United States Patent Office 3,362,479
Patented Jan. 9, 1968

3,362,479
DRIVE SHAFT ASSEMBLY
Bruce S. Wilkinson, Beverly Farms, Mass., assignor to Avco Corporation, Cincinnati, Ohio, a corporation of Delaware
Filed Oct. 19, 1965, Ser. No. 497,944
10 Claims. (Cl. 170—160.29)

This invention relates to a drive shaft assembly and more particularly to a drive shaft assembly for use in controllable pitch propeller apparatus.

Many applications exist wherein a rotary driven shaft is required to be axially moved during its rotation. Such applications exist in automatic machinery of various types, machines for drilling operations, etc. One particular application is found in the operation of certain controllable pitch propeller systems in the marine field.

One method of changing the pitch of the propeller blades in a controllable pitch propeller system is to pivotally connect the propeller blades to a drive shaft having a hollow portion and control their pivotal rotation by utilizing a second shaft located within the hollow portion of the driven propeller shaft.

Heretofore, there have been various schemes suggested, utilizing both mechanical and hydraulic power to adjust the control rod to the desired location in such systems. These devices have included hydraulic rams in the propeller hub or propeller shaft and linear actuators which move the control rod through mechanical linkages.

These devices thus far have generally proved inadequate in that they each have specific undesirable qualities inherent in their structure. Hydraulic rams in the hub or shaft generally are subject to leakage of fluid which produces a hunting characteristic in the system or, in some cases, complete loss of control. Other systems which rely on linear actuators are generally limited by the reliability of the actuators themselves. In addition, most of these systems provide bearings which are constantly under load during rotation of the shaft and introduce a multiplicity of parts and systems reducing the overall reliability of the entire system and requiring skilled maintenance and precision repairs.

Failure of the pitch changing device in many of these devices leaves the propeller blades freely rotating about their spindles, making the propeller drive assembly useless.

It is therefore, an object of the present invention to provide a drive shaft assembly system for producing linear axial motion through a rotationally driven shaft.

Another object of the invention is to provide a drive shaft assembly which produces linear axial movement when rotationally driven, which is more reliable and less expensive to manufacture than presently known assemblies.

A further object of the invention is to provide a drive shaft assembly which is specifically useful in controllable pitch propeller apparatus.

A further object of the invention is to provide a controllable pitch propeller assembly which is simple and economical to manufacture, easily maintained, and provides a high degree of reliability.

Another object of the invention is to provide a controllable pitch propeller assembly wherein the pitch of the blades remains constant should failure occur in the pitch changing means provided.

These objects, and other objects which will be apparent as the description proceeds, are achieved by providing a drive shaft assembly which has a first rotary driven shaft and a second shaft disposed in axial alignment, a friction drive means connects the first and second shafts and a first positioning member is also driven through a friction connection by the drive shaft. The first positioning member is engaged on threads provided on the second shaft and a second positioning member is slidably engaged on a portion of the second shaft and rotated by the second shaft.

By applying a braking force to the first positioning member while the shafts are rotating, the second shaft is caused to move axially with respect to the first shaft in one direction by relative movement of the threadedly engaged portions of the assembly.

Application of a braking force to the second positioning member stops or slows rotation of the member and second shaft and the first positioning member, still being driven by the first shaft, causes the second shaft to move by relative motion at the threaded connection.

Should either of the braking forces fail, the first shaft remains fixed relative to the second shaft, and will remain so until a braking force is applied to either of the positioning members.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a sectional elevational view showing a drive shaft assembly constructed in accordance with the present invention;

FIGURE 2 is an elevational view taken along lines 2—2 of FIGURE 1 showing a detail of the invention;

FIGURE 3 is an elevational view, partially in section, showing a controllable pitch propeller assembly having the invention employed therein; and FIGURE 4 is a fragmentary sectional view taken along lines 4—4 of FIGURE 3 showing a portion of the assembly in detail, taken on an enlarged scale for clarity.

Referring to the drawings especially FIGURES 1 and 2, there is shown a drive shaft asssembly 10 which comprises a shaft 11 driven in a rotary direction by any suitable power means. A second shaft 12 is located in axial alignment with the shaft 11 and is disposed in a hollow portion provided in the shaft 11. The shaft 12 comprises a threaded portion 13 and a key portion 14 which is substantially rectangular in cross section.

As best shown in FIGURE 1, a positioning member in the form of a nut 16 having threads provided thereon is engaged on the threaded portion of the shaft 12. A second positioning member in the form of a hollow cylinder 17 is disposed adacent the end of the shaft 12, and has a rectangular opening 18 provided therein for interfitting and slidable engagement of the key portion 14 of the shaft 12.

Each of the positioning members 16 and 17 is provided with an outwardly projecting flange, 19 and 21 respectively and the nut 16 is also provided with inwardly projecting flanges 22 and 23 which serve to retain the hollow cylinder 17 and the nut 16 against axial movement with respect to the shaft 11.

The drive shaft 11 is rotatably engaged with the shaft 12 and the nut 16 through friction drive means in the form of drag clutches 24 and 26 respectively.

The drag clutches 24 and 26 may take any suitable form depending on the size and power requirements of the specific application. As shown in FIGURE 1, the drag clutches 24 and 26 are annular members which are manufactured of any suitable resilient material such as rubber, neoprene, etc. The drag clutches 24 and 26 are so dimensioned that they are compressed between adjacent members with a radial force sufficient to interconnect the adjacent members for driving purposes, yet small enough to be overcome by the braking means provided to stop relative motion of the adjacent members.

Still referring to FIGURE 1, the means for applying a braking force to the flange 19 of the nut 16, the flange 21 of the cylinder 17 comprises a pair of disc brake assemblies 27 and 28 respectively. Although the braking force may be applied by any suitable braking means well known in the art, disc brakes 27 and 28 are easily adapted and well suited for the present application as such units may be purchased as standard items and are relatively inexpensive.

In operation, with the brakes 27 and 28 released, rotation of the shaft 11 causes rotation of the shaft 12 through the drag clutch 24, and rotation of the nut 16 through the drag clutch 26. In turn, rotation of the shaft 12 produces rotation in the cylinder 17 through its engagement with the key portion 14 of the shaft 12.

It should be obvious that during normal rotation, with the shaft 12 fixed relative to the shaft 11, there are no wearing surfaces between the elements of the drive shaft assembly 10.

When it is desired to move the shaft 12 relative to the shaft 11 in one direction, the brake 27 is applied to the flange 19 of the nut 16. The drag clutch 26 starts to slip as soon as a braking force is applied to the nut 16, and the shaft 12, which is still being rotated by the shaft 11, starts to move axially in the one direction as the threaded portion 13 is unscrewed from the nut 16. Likewise when it is desired to move the shaft 12 in the opposite direction with respect to the shaft 11, the brake 28 is applied to the flange 21 of the cylinder 17 and slippage takes place at the drag clutch 24 as the shaft 12 is restrained against rotation by its interconnection with the cylinder 17. The nut 16 continues to turn, being driven by the shaft 11, and the resultant effect is to screw the threaded portion 13 through the nut 16.

It should here be noted that the only wear on the drag clutches 24 and 26 takes place during actual movement of the shaft 12 relative to the shaft 11. In like manner, wear on the braking surfaces of the disc brakes 27 and 28 occurs only during relative movement of the shafts 11 and 12. Therefore, although the shaft assembly 10 might be in operation for a great period of time, a small amount of wear occurs on the shaft assembly elements described.

In addition, should the brakes 27 and 28 fail to function, there is no relative motion caused between the shaft 11 and the shaft 12, and the shafts remain fixed relative to each other to function in a normal manner.

Referring now to FIGURES 3 and 4 there is shown a marine controllable pitch propeller assembly 30 comprising a propeller hub assembly 31 fitted to a drive shaft 35 and supported at its aft end by a fixed fairwater 32 attached to the hull of the driven craft by a strut 33. The hub assembly 31 comprises a hub portion 34 and a cylindrical portion 36 which is received in the bearing 37 of the fairwater 32. The shaft 35 may be supported forward of the hub by any suitable bearing means as it leaves the hull of the craft, and is free to rotate by virtue of its engagement with a bearing assembly 37 located in the fairwater 32.

The propeller hub assembly 31 is provided with a hollow opening 38 at the aft end and has a slidable plunger 39 disposed in the opening. The plunger 39 is a slidable fit for axial movement in the opening 38 and rotates continuously with the propeller shaft 31 through its connections to the propeller blades, which will be explained in detail as the description proceeds.

At the aft end of the plunger 39 an opening is provided to receive a control shaft 41. The control shaft 41 is provided with a drag clutch 42 having a face portion disposed adjacent a surface of the plunger 39 and a face portion retained by a retaining nut 43. The drag clutch 42 may be of any type well known in the art, or may be merely compressed by the axial load between the plunger 39 and the control shaft 41.

Referring still to FIGURE 3 the control shaft 41 extends axially, and rearwardly with respect to the propeller hub assembly 31, and has a threaded portion 44 provided on its outer surface, and a keyed portion 46 having a key 47 fastened therein by any suitable means such as screws or bolts (not shown). The key portion 46, in turn is received in a positioning member in the form of a circular disc 48. The disc 48 is slidably connected to the control shaft 41 and is turned by rotation of the shaft in a similar fashion to the flange 21 of FIGURES 1 and 2.

Returning to the threaded portion 44 of the control shaft 41, it will be noted that this portion is received in threaded engagement by a positioning member in the form of a control nut 49. The control nut 49 is connected to the propeller shaft by a friction drive means in the form of the drag clutch 51 which may be similar to the drag clutch 42 previously described.

Likewise, as with the connection between the control shaft 41 and the plunger 39, a retaining nut 52 is provided at the aft end of the control nut 49 to retain the control nut captive in the propeller shaft 31. The control nut 49 has a plurality of dowels 53 which are slidably engaged in a second disc member 54 which serves to complete the positioning means.

Each of the discs 48 and 54 is received between a pair of hydraulic disc brake assemblies 56 and 57 respectively and a stationary block 58.

The disc brakes 56 and 57 may be of any type well known in the art, and may be hydraulically, pneumatically, electrically, or mechanically actuated. In the embodiment shown, the braking means 56 is operative by applying hydraulic pressure through a cylinder to the face of the disc 48 forcing it against the stationary block 58. Likewise, the braking means comprising the disc brake 57 is operated by applying hydraulic pressure through a cylinder to the face of the second disc 54, forcing it against the block 58. Both the block 58 and the brake assemblies 56 and 57 may be provided with replaceable friction pads, which is an expedient well known in the art.

In addition, the brakes 56 and 57 may be operated from a single hydraulic pressure source (not shown) through a reversing valve, as they are not required to be operated simultaneously in the present application.

Referring now to FIGURES 3 and 4, as was noted above, the plunger 39 is rotated through interconnection with the propeller blades. A typical connection is best shown in FIGURE 4, wherein the propeller blade 59 is provided with a spindle 60 extending through the propeller hub assembly 31 and having at its lower end a connecting pin 61. The connecting pin 61 is slidably engaged in a spherical bearing assembly 62.

As will be noted in FIGURE 3, movement of the plunger 39 causes both sliding and turning motion at the spherical bearing 62, which in turn, causes rotation of the spindle 60 and the blade 59.

As is obvious, the number of blades may vary according to specific requirements, each blade being disposed about the periphery of the propeller hub assembly 31 in the manner described and shown.

Although the system shown in FIGURES 3 and 4 is more detailed than that shown in FIGURES 1 and 2, the operation is identical to the operation of the embodiment shown in FIGURES 1 and 2.

With the propeller hub assembly 31 rotating, the control shaft 41 is rotated by friction drive at the drag clutch 42 and the control nut 49 is rotated by friction drive at the drag clutch 51. The plunger 39 remains fixed axially with respect to the propeller hub assembly 31.

Should it be desired to change the pitch of the propeller blades 59 either the disc brake 56 or the disc brake 57 is actuated depending on the direction of the change in propeller pitch required.

Actuation of the brake 56 serves to retard rotation of the disc 48, and consequentially rotation of the shaft 41 is retarded with respect to the propeller shaft 31. Slippage takes place at the drag clutch 42 and relative rotary motion between the nut 49 (which is rotating at the same speed as the hub assembly 31) and the shaft 41, causes the shaft 41 to move axially relative to the hub assembly 31.

To change the pitch of the propeller blades 59 in the opposite direction a braking load is applied at the disc brake 57 and rotation of the disc 54 is retarded relative to the hub assembly 31, as is rotation of the nut 49. Slippage takes place at the drag clutch 51 and the control shaft 41 is moved in the opposite direction axially relative to the hub assembly 31.

Here again, should the brake means 56 and 57 fail to function due to hydraulic leakage or other malfunction, the plunger 39 remains axially fixed. The propeller blades therefore, remain substantially locked in their present pitch and are useful to provide power to the craft, until repairs can be made.

It should therefore, be evident that the present invention provides a controllable pitch propeller assembly which is simple in construction, easy to maintain and has fewer parts than prior art devices of this type. In addition, the drive shaft assembly disclosed is simple in operation and in its marine application does not translate high loads to the hull, as the only force received at the hull is a braking torque.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

What is claimed is:

1. A drive shaft assembly comprising:
a first rotary driven shaft,
a second shaft in axial alignment with said first shaft,
friction drive means rotatably engaging said first shaft with said second shaft,
a first positioning member threadedly engaged on said second shaft,
other friction drive means rotatably engaging said first shaft with said first positioning member,
a second positioning member slidably engaged on said second shaft for rotation thereby,
means for applying a braking force to said first positioning member while said first shaft is rotating to thereby cause said other friction drive to slip to cause said second shaft to move axially with respect to said first shaft in one direction, and
means for applying a braking force to said second positioning member while said first shaft is rotating to thereby cause said friction drive means to slip to cause said second shaft to move axially with respect to said first shaft in the opposite direction.

2. A drive shaft assembly comprising:
a first rotary driven shaft,
a second shaft in axial alignment with said first shaft and having a key portion and a threaded portion,
friction drive means rotatably engaging said first shaft with said second shaft,
a first positioning member engaged on the threaded portion of said second shaft,
other friction drive means rotatably engaging said first shaft with said first positioning member,
a second positioning member disposed on said second shaft and having an opening provided therein for slidably receiving the key portion of said second shaft,
means for applying a braking force to said first positioning member while said first shaft is rotating to thereby cause said other friction drive means to slip to cause said second shaft to move axially with respect to said first shaft in one direction, and
means for applying a braking force to said second positioning member while said first shaft is rotating to thereby cause said friction drive means to slip to cause said second shaft to move axially with respect to said first shaft in the opposite direction.

3. A controllable pitch propeller assembly comprising:
a propeller hub assembly having a plurality of adjustable blades disposed thereon,
adjusting means mounted for axial movement in the hub assembly and rotated thereby for changing the pitch of said blades when moved axially,
a control shaft in axial alignment with said propeller hub assembly,
drive means rotatably engaging said propeller hub assembly with said control shaft,
a first positioning member contained in the hub assembly threadedly engaged on said control shaft,
other drive means rotatably engaging said propeller hub assembly with said first positioning member,
a second positioning member slidably engaged on said control shaft for rotation thereby,
means for applying a braking force to said first positioning member while said propeller hub assembly is rotating to thereby cause said control shaft to move axially with respect to said propeller hub assembly in one direction, and
means for applying a braking force to said second positioning member to thereby cause said control shaft to move axially with respect to said propeller hub assembly in the opposite direction.

4. A controllable pitch propeller assembly comprising:
a propeller hub assembly having a plurality of adjustable blades disposed thereon,
a control shaft in axial alignment with said propeller hub assembly and having a keyed portion and a threaded portion,
adjusting means mounted for axial movement in the hub assembly and rotated thereby for changing the pitch of said blades when moved axially,
friction drive means rotatably engaging said adjusting means assembly with said control shaft,
a first positioning member engaged on the threaded portion of said control shaft,
other friction drive means rotatably engaging said propeller hub assembly with said first positioning member,
a second positioning member disposed on said control shaft and having an opening provided therein for slidably receiving the keyed portion of said control shaft,
means disposed adjacent said first positioning member for applying a braking force to said first positioning member while said propeller hub assembly is rotating to thereby cause said other friction drive means to slip to cause said control shaft to move axially with respect to said propeller hub assembly in one direction, and
means disposed adjacent said second positioning member for applying a braking force to said second positioning member to thereby cause said friction drive means to slip to cause said control shaft to move axially with respect to said propeller hub assembly in the opposite direction.

5. A controllable pitch propeller assembly comprising:
a propeller hub assembly having a hollow portion provided at one end with a slidable plunger disposed therein,
a control shaft in axial alignment with said propeller hub assembly,
friction drive means rotatably engaging said control shaft with said propeller hub assembly plunger, a first positioning member threadedly engaged on said control shaft, other friction drive means rotatably engaging said propeller hub assembly with said first positioning member, a second positioning member slidably engaged on said control shaft for rotation thereby, means disposed adjacent said first positioning member for applying a braking force to said first positioning member while said propeller hub assembly is rotating to thereby cause said control shaft to move axially with respect to said propeller hub assembly in one direction, means disposed adjacent said second positioning member for applying a braking force to said second positioning member to thereby cause said control shaft to move axially with respect to said propeller hub assembly in the opposite direction, a plurality of propeller blades each having a spindle portion, said propeller hub assembly having a plurality of openings provided therein near said plunger each having one of said blade spindle portions received in interfitting engagement therein, and means interconnecting each of said spindles with said plunger for providing rotational movement of each of said spindles responsive to axial sliding movement of said plunger whereby movement of said control shaft is effective to change the pitch of said propeller blades.

6. The structure of claim 5 wherein said means interconnecting each of said spindles with said plunger comprises an arm provided on said spindle and extending radially outwardly therefrom into said propeller hub assembly hollow portion, and a spherical bearing assembly disposed on said plunger and having said spindle arm slidably received therein.

7. A controllable pitch propeller assembly comprising:
a propeller hub assembly having a hollow portion provided at one end with a slidable plunger disposed therein,
a control shaft in axial alignment with said propeller hub assembly and having a key portion and a threaded portion,
friction drive means rotatably engaging said propeller hub assembly with said control shaft,
a first positioning member engaged on the threaded portion of said control shaft and retained against axial movement by said propeller hub assembly,
other friction drive means rotatably engaging said propeller hub assembly with said first positioning member,
a second positioning member disposed on said control shaft and having an opening provided therein for slidably receiving the key portion of said control shaft,
means disposed adjacent said first positioning member for applying a braking force to said first positioning member while said propeller hub assembly is rotating to thereby cause said control shaft to move axially with respect to said propeller hub assembly in one direction,
means disposed adjacent said second positioning member for applying a braking force to said second positioning member to thereby cause said control shaft to move axially with respect to said propeller hub assembly in the opposite direction,
a plurality of propeller blades each having a spindle portion,
said propeller hub assembly having a plurality of openings provided therein near said plunger each having one of said blade spindle portions received in interfitting engagement therein,
each of said spindles having an arm provided thereon extending radially outwardly therefrom into said propeller hub assembly hollow portion, and spherical bearing assembly for each of said spindles disposed on said plunger, and having said spindle arms slidably received therein whereby movement of said control shaft is effective to change the pitch of said propeller blades.

8. A controllable pitch propeller assembly comprising:
(a) a propeller hub assembly having a plurality of adjustable blades disposed in a hub and a tubular extension on the hub,
(b) a control shaft in axial alignment within the hub assembly,
(c) adjusting means slidably mounted in the hub for axial movement relative to the hub and rotated by the hub, interconnecting said control shaft with said blades for changing the pitch of said blades by the axial movement of the adjusting means, the interconnection being a first friction drive having one portion housed in the adjusting means and a complementary portion on the control shaft,
(d) a first positioning means rotatably connected in the extension and threadedly engaged on said control shaft, said connection being a second friction drive having one portion in contact with said extension and a complementary portion on said first positioning means,
(e) means disposed adjacent to the first positioning member for applying a braking force to the first positioning member while the propeller hub assembly is rotating to thereby cause the second friction drive to slip to cause the control shaft to move axially with respect to the propeller hub in one direcion,
(f) second positioning member slidably engaged on the control shaft,
(g) means disposed adjacent to the second positioning member for applying a braking force to the second positioning member to thereby cause the first friction drive to slip to cause the control shaft to move axially with respect to the propeller hub assembly in the opposite direction.

9. A controllable pitch propeller assembly comprising:
(a) a propeller hub assembly having a plurality of adjustable blades disposed in the hub assembly,
(b) a control shaft in axial alignment within the hub assembly,
(c) adjusting means slidably mounted in the hub for axial movement relative to the hub and rotated by the hub, said adjusting means is rotatably connected to said control shaft and also connected to said blades for changing the pitch of said blades by the axial movement of the adjusting means,
(d) a first positioning means rotatably mounted to the hub assembly and threadedly engaged on said control shaft,
(e) means for applying a braking force to the first positioning member while the propeller hub assembly is rotating to thereby cause it to rotate relative to the hub assembly to cause the control shaft to move axially with respect to the propeller hub assembly in one direction,
(f) second positioning member slidably engaged on the control shaft,
(g) means for applying a braking force to the second positioning member to thereby cause the control shaft to rotate relative to the adjusting means to cause the control shaft to move axially with respect to the propeller hub assembly in the opposite direction.

10. A controllable pitch propeller assembly comprising:
(a) a propeller hub assembly having a plurality of adjustable blades disposed in the hub assembly,
(b) a control shaft in axial alignment within the hub assembly relative to the hub and rotated by the hub, interconnecting said control shaft being coupled to said blades for changing the pitch of said blades by the axial movement thereof, the control shaft also being rotatably connected to said hub assembly, (c) a first positioning means rotatably mounted in the hub assembly and threadly engaged on said control shaft, (d) means for applying a braking force to the first positioning member while the propeller hub assembly is rotating to thereby cause it to rotate relative to the hub assembly to cause the control shaft to move axially with respect to the propeller hub assembly in one direction, (e) second positioning member slidably engaged on the control shaft, (f) means for applying a braking force to the second positioning member to thereby cause the control shaft to rotate relative to the hub assembly to cause the control shaft to move axially with respect to the propeller hub assembly in the opposite direction.

References Cited

UNITED STATES PATENTS

| | | | |
|---|---|---|---|
| 2,423,191 | 7/1947 | Kopp | 170—160.29 X |
| 2,711,796 | 6/1955 | Amiot | 170—160.29 |

FOREIGN PATENTS

| | | |
|---|---|---|
| 1,225,562 | 2/1960 | France. |

EVERETTE A. POWELL, JR., *Primary Examiner.*